(12) United States Patent
Potier et al.

(10) Patent No.: US 12,459,632 B2
(45) Date of Patent: Nov. 4, 2025

(54) AIRCRAFT SPOILER SYSTEM

(71) Applicant: Goodrich Actuation Systems SAS, Saint-Marcel (FR)

(72) Inventors: Karl Potier, Paris (FR); Quentin Ricard, Eaubonne (FR)

(73) Assignee: GOODRICH ACTUATION SYSTEMS SAS, Saint-Marcel (FR)

( * ) Notice: Subject to any disclaimer, the term of this patent is extended or adjusted under 35 U.S.C. 154(b) by 0 days.

(21) Appl. No.: 19/024,598

(22) Filed: Jan. 16, 2025

(65) Prior Publication Data

US 2025/0256834 A1 Aug. 14, 2025

(30) Foreign Application Priority Data

Feb. 14, 2024 (EP) ..................... 24305255

(51) Int. Cl.
*B64C 9/32* (2006.01)
(52) U.S. Cl.
CPC .................... *B64C 9/323* (2013.01)
(58) Field of Classification Search
CPC .................................................... B64C 9/323
See application file for complete search history.

(56) References Cited

U.S. PATENT DOCUMENTS 11,673,646 B2 * 6/2023 Huynh ............... B64C 9/20
244/215

FOREIGN PATENT DOCUMENTS

| CN | 108216683 B | 5/2021 |
|---|---|---|
| EP | 4186788 A1 | 5/2023 |
| EP | 4209415 A1 | 7/2023 |

OTHER PUBLICATIONS

European Search Report for Application No. 24305255.2, mailed Aug. 20, 2024, 7 pages.

* cited by examiner

*Primary Examiner* — Justin M Benedik
(74) *Attorney, Agent, or Firm* — CANTOR COLBURN LLP

(57) ABSTRACT

An aircraft spoiler system includes a spoiler, a motor arranged to drive movement of the spoiler between a retracted and a deployed position, a power supply connector for connection to an external power supply, and a movement limiting portion. The movement limiting portion is selectively engageable. It is arranged, when engaged, to enable movement of the spoiler towards the retracted position and to prevent movement towards the deployed position. The movement limiting portion comprises a mechanical actuator actuatable to move between a first position and a second position. Actuation of the mechanical actuator to the second position disengages the movement limiting portion. In the second position, the mechanical actuator obstructs the power supply connector such that the mechanical actuator cannot be actuated to the second position.

15 Claims, 8 Drawing Sheets

AIRCRAFT SPOILER SYSTEM

CROSS-REFERENCE TO RELATED APPLICATIONS

This application claims the benefit of European Patent Application No. 24305255.2 filed Feb. 14, 2024, the disclosure of which is incorporated herein by reference in its entirety.

TECHNICAL FIELD

This disclosure relates to an aircraft spoiler system, a method of putting an aircraft spoiler system into a maintenance mode of operation, and a method of taking an aircraft spoiler system out of the maintenance mode of operation and putting it in an operational mode of operation.

BACKGROUND

It is known to provide a spoiler on a wing of an aircraft. The spoiler may be moved between a retracted position, in which the spoiler lies flat in line with the aerofoil shape of the wing, and a deployed position in which the spoiler extends upwards away from the aircraft wing. In the retracted position the spoiler has little or no effect on the airflow over the wing, and therefore has little impact on lift. In the deployed position the spoiler extends upwards into the airflow and disrupts the airflow over the wing, reducing lift.

Aircraft spoiler systems include components to control actuation of the spoiler(s) between the retracted position and the deployed position. For example, it is known to control the movement of aircraft spoilers using hydraulic actuation systems.

It is important that appropriate safety mechanisms are provided to ensure safe operation of the aircraft even in the event that the spoiler actuation system fails, and in particular to prevent the spoiler from unintentionally opening to the deployed position. It is furthermore important that such safety mechanisms can be safely engaged and disengaged as required, e.g. to carry out maintenance operations.

SUMMARY

According to a first aspect of this disclosure there is provided an aircraft spoiler system. The system includes: a spoiler; a motor arranged to drive movement of the spoiler between a retracted position and a deployed position; a power supply connector arranged for connection to an external power supply, to supply power to the aircraft spoiler system; and a movement limiting portion (i.e. a movement limiter), wherein the movement limiting portion is selectively engageable and wherein the movement limiting portion is arranged, when engaged, to enable movement of the spoiler towards the retracted position (e.g. in a first direction) and to prevent movement of the spoiler towards the deployed position (e.g. in a second direction, opposite to the first direction). The movement limiting portion includes a mechanical actuator, actuatable to move between a first position and a second position, wherein actuation of the mechanical actuator to the second position disengages the movement limiting portion. In the second position, the mechanical actuator obstructs the power supply connector such that the mechanical actuator cannot be actuated to the second position if the power supply connector is connected to the external power supply and such that the power supply connector cannot be connected to the external power supply if the mechanical actuator is in the second position.

By locating the power supply connector and the mechanical actuator of the movement limiting portion such that the mechanical actuator obstructs connection of the power supply connector to an external power supply when in the second position, the connection or disconnection of the power supply connector of the aircraft spoiler system is functionally linked to the disengagement of the movement limiting portion in such a way as to improve safety of the aircraft spoiler system. In particular, disengaging the movement limiting portion (which is required for safe maintenance) by moving the mechanical actuator to the second position is only possible if the external power supply has already been disconnected from the power supply connector, such that a maintenance person cannot begin maintenance without first disconnecting the external power supply. Conversely, the electrical supply cannot be connected without first moving the mechanical actuator to the first position, thus ensuring that the aircraft systems cannot be returned to operation (with power supplies connected) without also re-engaging the movement limiting portion, which is a key safety feature. The aircraft spoiler system according to the present disclosure provides this functional linking in a manner which is particularly compact and safe, and which requires relatively few mechanical parts and is therefore simpler and cheaper than other solutions.

The movement limiting portion is arranged, when engaged, to enable movement of the spoiler towards the retracted position, but to prevent (i.e. disable) movement of the spoiler towards the deployed position-thus it limits motion of the spoiler such that the spoiler can be moved only towards the retracted position. It will be appreciated that under normal conditions, when the movement limiting portion is not engaged, the spoiler can be driven in both directions by the motor (i.e. it can also be driven towards the deployed position). The motor may also hold the spoiler in a given position once it has been driven to that position. It is a key safety feature to be able to prevent movement of the spoiler towards the deployed position under certain circumstances. For example, if the motor power supply has failed so the motor no longer holds the spoiler in position it is important to prevent the spoiler from spontaneously moving towards the deployed position. However, it is also important in some circumstances to disengage the movement limiting portion, in particular where maintenance of the spoiler system is to be carried out.

It will be understood by the skilled person that the deployed position and the retracted position of the spoiler are recognised terms in the field of aircraft spoilers, and would be understood by the skilled person to have the meanings set out above in the background section. When engaged, the movement limiting portion allows movement of the spoiler towards the retracted position but prevents movement towards the deployed position (i.e. away from the retracted position). It will be understood that the spoiler travels along a first movement path in a first direction from the retracted position to the deployed position and travels along a second movement path in a second direction from the deployed position to the retracted position, where the first and second movement paths may be the same. Thus, when engaged, the movement limiting portion prevents movement of the spoiler along the first movement path in the first direction. Moving "towards" the deployed position need not be understood as referring to a particular direction of movement (e.g. back or forwards), but rather means that the spoiler is prevented from moving in any way which it must move to get to the deployed position (e.g. even if the movement path it travels is not linear, it is prevented from moving at all along this movement path in the direction it moves to get to the deployed position).

The mechanical actuator is actuatable (e.g. manually actuatable) to disengage the movement limiting portion. By this it will be understood that the movement limiting portion is disengaged by moving the mechanical actuator to the second position, and remains disengaged whilst the mechanical actuator remains in the second position. It will be understood that it does not follow from this that when the mechanical actuator is in the first position the movement limiting portion is engaged. Rather, with the mechanical actuator in the first position, the movement limiting portion is engageable (i.e. able to be engaged), which it is not when the mechanical actuator is in the second position, in which it is definitively disengaged so that it cannot engage to prevent movement of the spoiler. In some examples, the aircraft spoiler system further comprises a limiter engagement portion, arranged to control engagement of the movement limiting portion. This may be separate to the movement limiting portion (or may be part of the movement limiting portion, e.g. the mechanical actuator) and may control engagement of the movement limiting portion, e.g. in dependence on detecting certain types of fault with the aircraft spoiler system, such as a power supply fault.

The power supply connector (e.g. electronic power harness) is arranged for connection to an external power supply. It will be understood that the power supply is referred to as external since it is external to the aircraft spoiler system, but it will be appreciated that it is not external to the aircraft. Thus, the external power supply may also be referred to as the aircraft power supply.

The present disclosure extends to an aircraft including such a spoiler system, thus according to a second aspect of this disclosure there is provided an aircraft, comprising an aircraft spoiler system as described above. In some examples, the aircraft further comprises an aircraft power supply, and an aircraft power supply connector (i.e. an external power supply connector, which may be, for example, an aircraft power harness) connected to the aircraft power supply (i.e. the external power supply), wherein the aircraft power supply connector is selectively connectable to the power supply connector to supply power to the aircraft spoiler system.

According to a third aspect of this disclosure there is provided a method of putting an aircraft spoiler system into a maintenance mode of operation, comprising: disconnecting an external power supply connector from a power supply connector of the aircraft spoiler system; and actuating a mechanical actuator of a movement limiting portion from a first position to a second position, wherein the movement limiting portion is arranged, when engaged, to enable movement of the spoiler towards the retracted position and to prevent movement of the spoiler towards the deployed position and wherein actuation of the mechanical actuator to the second position disengages the movement limiting portion, and wherein, in the second position, the mechanical actuator obstructs the power supply connector such that the mechanical actuator cannot be actuated to the second position if the power supply connector is connected to the external power supply.

In some examples, the method further comprises (i.e. after actuating the mechanical actuator to the second position), carrying out maintenance on the aircraft spoiler system. In some examples, actuating the mechanical actuator from the first position to the second position comprises lifting the mechanical actuator (e.g. along an axis of rotation) and/or turning (i.e. twisting, rotating) the mechanical actuator.

According to a fourth aspect of this disclosure, there is provided a method of taking an aircraft spoiler system out of the maintenance mode of operation and putting it in an operational mode of operation, comprising: actuating a mechanical actuator of a movement limiting portion from a second position to a first position, wherein the movement limiting portion is arranged, when engaged, to enable movement of the spoiler towards the retracted position and to prevent movement of the spoiler towards the deployed position and wherein actuation of the mechanical actuator to the second position disengages the movement limiting portion, and wherein, in the second position, the power supply connector cannot be connected to the external power supply if the mechanical actuator is in the second position; and connecting (e.g. re-connecting) an external power supply connector to a power supply connector of the aircraft spoiler system.

In some examples, the method further comprises (e.g. after connecting the external power supply connector) operating the aircraft (i.e. for normal flight). This operation may comprise actuating the spoiler towards the deployed position. In some examples, actuating the mechanical actuator from the second position to the first position comprises turning (i.e. twisting, rotating) the mechanical actuator. There is furthermore disclosed a method comprising first carrying out the method according to the third aspect, and then later carrying out the method according to the fourth aspect.

In some examples, the mechanical actuator is actuatable between the first position and the second position by rotation of the mechanical actuator around a rotation axis, i.e. it is arranged to move between the first position and the second position by rotation, around a rotation axis. The second position may be a 90° rotation relative to the first position (i.e. a quarter turn of rotation). In some examples, the actuation is movement by hand, e.g. by a maintenance person.

In some examples, the mechanical actuator is rotationally asymmetric about the rotation axis. This is advantageous since as a result of being asymmetric, the properties of the mechanical actuator in a plane parallel to the rotation axis vary as the mechanical actuator is rotated between the first and second positions, and this variation can be used to provide the recited obstruction only in the second position and not in the first position.

In some examples, the mechanical actuator comprises an elongate portion (e.g. an extension). The elongate portion may be provided by a handle of the mechanical actuator. Alternatively, it may be provided separately to a handle (i.e. separately to the part that is actuated). The elongate portion extends a first length along a first direction in a plane perpendicular to the rotation axis, and extends a second length along a second direction in the plane perpendicular to the rotation axis, the first direction being perpendicular to the second direction, and the first length being longer than the second length. Thus, with reference to a plane perpendicular to the rotation axis, the elongate portion extends further in one direction than along another, perpendicular direction. It will be understood that this effectively provides a change in length, perpendicular to the axis of rotation, of the elongate portion as it is rotated between the first and second position. This apparent change in length (in one plane) can be used to provide obstruction of the power supply connector selectively when the mechanical actuator is in the second position, by appropriately locating the power supply connector. The first length may be more than double the second length, optionally more than triple.

In particular, the power supply connector may be located in a position that is occupied by the additional length of the elongate portion when rotated into the second position, or located so that an electrical connected to the power supply connector is located in a position that is occupied by the additional length in the second position. The mechanical actuator may be arranged so that in the second position the first length extends towards the power supply connector. In some examples the power supply connector may be located a spacing distance away from the axis of rotation of the mechanical actuator, wherein the spacing distance is less than half of the first distance (i.e. less than half of the longer dimension of the elongate portion). Thus, once the mechanical actuator (and therefore elongate portion) is rotated to the second position, the elongate portion is in the way of the power supply connector and therefore obstructs it.

In some examples, the mechanical actuator comprises a handle (i.e. a part which is contacted by a user's hand for actuation). As set out above, the handle may provide the elongate portion.

It is preferable that once actuated to the second position, the mechanical actuator remains in the second position, thus disengaging the movement limiting portion, unless actively actuated back to the first position. Thus, in some examples, the aircraft spoiler system further comprises at least one retaining portion (e.g. retainer or retaining part), arranged to retain the mechanical actuator in the second position. The aircraft spoiler system may comprise at least two (optionally two) retaining portions. The movement limiting portion may comprise a housing. The at least one retaining portion may be provided on the housing or may be formed by the housing.

In some examples, the (optionally each) retaining portion comprises a protrusion, optionally an elongate ridge. This provides a retaining mechanism which is effective at securing the mechanical actuator in position, and is also easy to manufacture. The retaining portion may comprise a first elongate ridge and a second elongate ridge, which may extend parallel to one another. The first direction of the elongate portion may extend parallel to the elongate ridge(s) when the mechanical actuator is in the first position (and similarly the second direction may extend perpendicular). The second direction of the elongate portion may extend parallel to the elongate ridge(s) when the mechanical actuator is in the second position (and similarly the first direction may extend perpendicular).

In some examples, the mechanical actuator comprises a base portion. The base portion may be connected to the handle portion (e.g. such that the handle portion and the base portion rotate together). Although referred to as separate portions, it will be appreciated that in practice the handle portion and the base portion may be formed as a single integral piece. The base portion may contact the retaining portion (e.g. when the mechanical actuator is in the second position).

In some examples, the base portion extends a first length (i.e. a first base portion length) along a first direction in a plane perpendicular to the rotation axis, and extends a second length (i.e. a second base portion length) along a second direction in the plane perpendicular to the rotation axis, the first direction being perpendicular to the second direction, and the first length being longer than the second length. These referenced first and second directions may be the same as the first and second directions referenced in relation to the dimensions of the elongate portion (i.e. such that both are elongate along the same direction).

In some examples, the aircraft spoiler system comprises a first retaining part and a second retaining part, the first and second retaining parts separated by a separation distance along a separation direction (i.e. in a plane perpendicular to the rotation axis), wherein the separation distance is larger than the second length and wherein the separation distance is shorter than the first length. As a result of this arrangement, there is an orientation of the base portion (in which the second direction extends substantially parallel to the separation direction) in which the base portion fits between the two retaining parts. This is the first position. There is another orientation (i.e. the second position) in which the base portion does not fit between the two retaining parts (with the first direction extending substantially parallel to the separation direction, since the first distance is longer than the separation distance), and the base portion is therefore raised up on top of the two retaining parts (i.e. higher up relative to the rotation axis).

The first length of the elongate portion and the first length of the base portion may refer to the same length, e.g. if both are formed as a unitary piece. Thus, a single shape may provide both the obstructing function and the retaining function as described above. However alternatively, as illustrated in the later Figures, the elongate portion and the base portion may be shaped separately to fulfil each respective function. This allows the elongate portion to be made much longer for the purposes of providing the power obstruction, whereas the base portion may only need to be slightly longer along the first direction to achieve the retaining function.

In some examples, wherein the retaining portion comprises an elongate ridge, the length of the elongate ridge, perpendicular to the separation distance (in the plane perpendicular to the rotation axis), is less than the first length of the base portion. Thus, the ridge is shorter than the longer length of the base portion. This helps to prevent the movement limiting system from remaining disengaged even as the mechanical actuator is moved away from the second position. In particular, as the mechanical actuator begins to be turned back towards the first position, the underside of the base portion quickly stops being in contact with the retaining portion, since the retaining portion is relatively short, and therefore the mechanical actuator moves back down (i.e. downwards along the rotation axis). This also helps to ensure that if the mechanical actuator is only partially moved to the second position it will return to the first position.

In some examples, the mechanical actuator is biased downwards along the rotation axis (e.g. towards a housing of the movement limiting portion). In the second position the mechanical actuator may be located further upwards along the rotation axis than in the first position (e.g. in addition to being rotated). Thus, the retaining portion described above acts against this biasing to raise the mechanical actuator relative to the rotation axis (i.e. hold the mechanical actuator up). Thus, in some examples the mechanical actuator further comprises a biasing member, arranged to bias the mechanical actuator downwards along the rotation axis. This biasing may help to bias the mechanical actuator towards the first position, such that if the mechanical actuator is not fully moved to the second position (e.g. if actuation is incomplete), the mechanical actuator may return to the first position.

In some examples, the movement limiting portion comprises a housing. In some examples, the movement limiting portion comprises a mechanical actuator biasing spring, wherein the mechanical actuator biasing spring is positioned between the housing and the mechanical actuator to bias the mechanical actuator towards the housing (e.g. along the rotation axis).

In some examples, the movement limiting portion further comprises a wheel having a toothed outer circumference, and a pin movable between an engaged position in which it is in contact with the toothed outer circumference, and a disengaged position in which it is withdrawn away from the toothed outer circumference. This provides a particularly simple and effective mechanism by which movement in one direction (corresponding to a first direction of rotation of the wheel) can be enabled, whilst movement in the opposite direction (corresponding to the opposite direction of rotation of the wheel) is prevented. In some examples, the mechanical actuator is connected to the pin. This allows the mechanical actuator to disengage the movement limiting portion by moving the pin so that it is no longer able to contact the toothed outer circumference. The mechanical actuator may comprise the pin, e.g. the pin may be located within the mechanical actuator.

In some examples, the movement limiting portion further comprises a pin biasing spring, arranged to bias the pin towards the toothed outer circumference of the wheel. This helps to ensure that the pin is consistently in contact with the toothed outer circumference, even as the shape of that circumference varies and changes. The mechanical actuator may comprise the pin biasing spring, for example the pin biasing spring may be located within the mechanical actuator (e.g. within the handle and/or the base portion).

In some examples, the pin extends along an axial direction of the wheel (i.e. perpendicular to the outer circumference of the wheel). In some examples, the pin extends along the rotation axis of the mechanical actuator. A direction referred to as being (axially) outwards from the wheel, will be understood as being higher up along the rotation axis, and vice versa.

It will be understood that the teeth on the outer circumference of the wheel provide the directionality of the movement of the wheel—the teeth contact the pin in one direction of rotation in a manner which allows rotation, but in the other direction of rotation the contact is such as to prevent rotation. Thus, in some examples, the teeth of the toothed outer circumference are asymmetrical (i.e. relative to an axis extending along the axial direction). In some examples, a tooth (e.g. each tooth) of the toothed outer circumference comprises a first sloped surface and a second sloped surface, wherein the second sloped surface has a steeper slope angle than the first sloped surface. Thus, the pin is able to slide along the first sloped surface, to allow rotation in the corresponding direction, since the first sloped surface has a gentle slope, however the sharp angle of the second sloped surface sticks against the pin, causing a non-sliding contact and halting motion.

In some examples, the aircraft spoiler system further comprises a control unit, wherein the control unit is arranged to control the motor. In some examples, the control unit is arranged to receive power from the power supply connector. Thus, by controlling the motor, the control unit is arranged to control operation of the spoiler. It will therefore be appreciated that the motor is an electric motor.

In some examples, the aircraft spoiler system further comprises a shaft, connecting the motor to the spoiler. The aircraft spoiler system may further comprise gears, wherein the shaft is connected to the spoiler via the gears. In some examples, the movement limiting portion comprises the shaft (such that the movement limiting portion is able to directly limit movement of the spoiler by controlling movement of the shaft). Alternatively, the movement limiting portion may control the movement of the shaft (and therefore the spoiler) indirectly (e.g. via a clutch). Such indirect connection may be controlled by a separate limiter engagement portion, which may monitor for a fault (e.g. a power supply fault) and engage the movement limiting portion (e.g. by engaging the clutch) when a fault is detected.

It will be appreciated that where the aircraft spoiler system (or aircraft) is described as being configured to have certain features or carry out certain steps, the methods may likewise comprise the corresponding step. Similarly, the aircraft spoiler system may be configured to carry out any of the method steps referred to above.

BRIEF DESCRIPTION OF THE FIGURES

Certain preferred examples of this disclosure will now be described, by way of example only, with reference to the accompanying drawings, in which.

DETAILED DESCRIPTION

Figure 1:
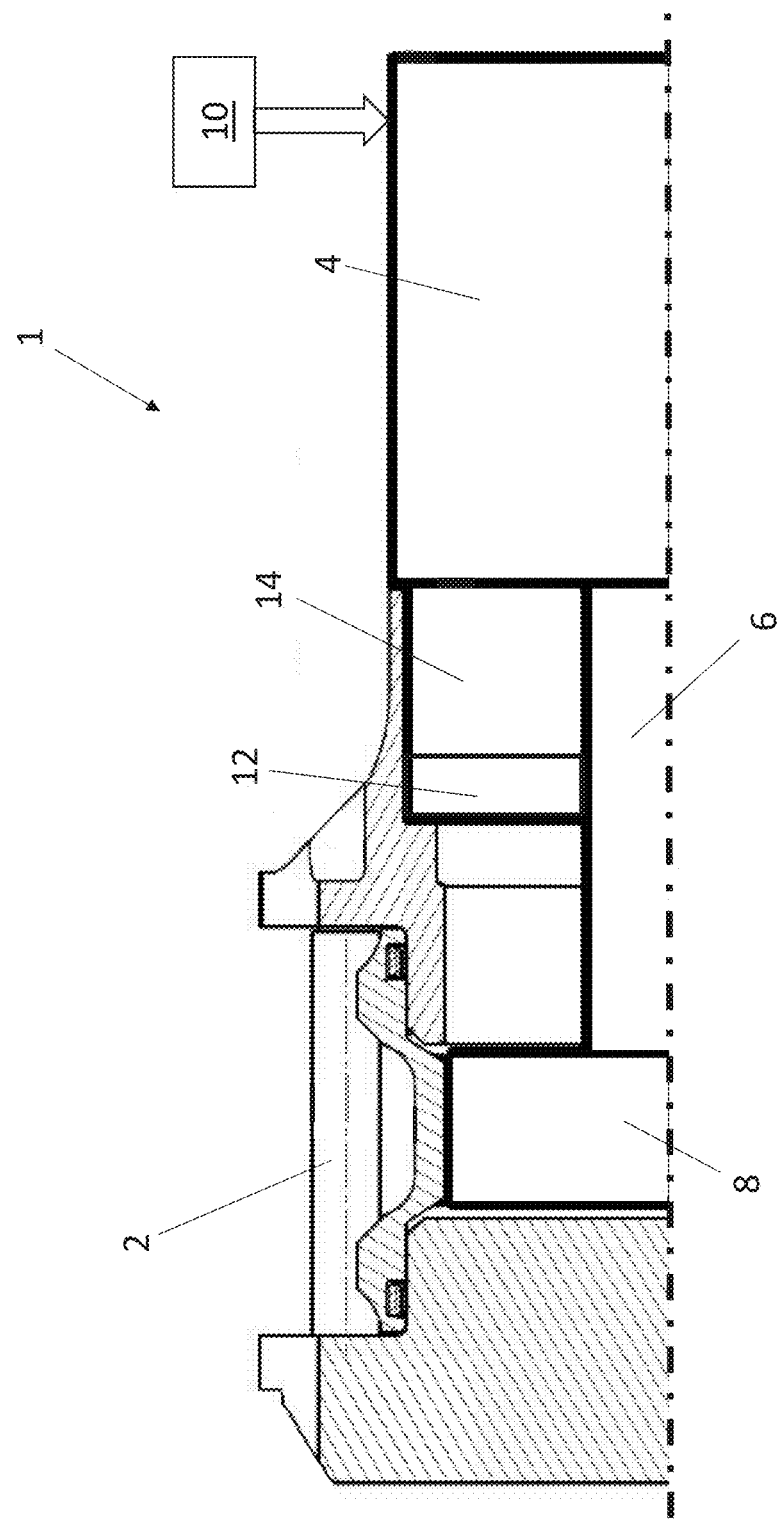
FIG. 1 is a schematic drawing showing an aircraft spoiler system according to the present disclosure.

FIG. 1 is a schematic drawing showing an aircraft spoiler system 1 according to the present disclosure. The aircraft spoiler system 1 includes a spoiler 2 together with a number of associated components, described further below, which together operate the spoiler 2.

FIG. 1 is a schematic cross-sectional view through the aircraft spoiler system 1, showing only the top part as indicated by the dashed line. The spoiler 2 is indicated in the Figure, however it will be understood that this may simply show a part of the spoiler 2 or a part which connects to the aircraft spoiler 2 to actuate it, for the purposes of explanation. The entire spoiler 2 therefore need not be shown in the view of FIG. 1.

The aircraft spoiler system 1 further includes a motor 4, a shaft 6 and gears 8. It also includes a control unit 10, a power supply connector 12, and a movement limiting portion 14, which is shown in greater detail in FIGS. 2-4. It will be appreciated that although the control unit 10 is illustrated in this schematic Figure, with a block arrow indicating that it controls the motor 4, it need not actually be located at, or even close to, the other components illustrated. Rather the Figure is intended to show the functional connection of the control unit 10 in controlling the motor 4.

As is known, spoilers are used on aircraft wings to reduce the lift of the aerofoil in a controlled way (e.g. to reduce speed of the aircraft, descend, or assist with roll motion of the aircraft). In its neutral, retracted position, a spoiler lies flat, in line with the aerofoil shape of the main aircraft wing, so that it has little or no influence on the aerofoil. In the deployed position the spoiler extends upwards away from the aircraft wing, such that it extends into the airflow over the wing and "spoils" the streamline flow. This reduces the lift created by the wing section in which the deployed spoiler is located.

A spoiler actuation system of an aircraft controls movement of such a spoiler (or multiple spoilers), to control their movement between the deployed position and the retracted position. In particular, the control unit 10 controls movement of the spoiler 2 by controlling motion of the motor 4. The motor 4 in turn drives movement of the shaft 6, which is connected to the gears 8. The gears 8 are connected to the spoiler 2 so that movement of the motor ultimately causes movement of the spoiler 2.

The control unit 10 controls the motor 4 by controlling the supply of power to the motor 4, i.e. since the motor is an electric motor. The power to the control unit 10 (and to other powered components of the aircraft spoiler system 1) is supplied through a power supply connector 12, which is connected to an external power supply via an external power supply connector 16, seen in FIGS. 5 and 6. The power supply is referred to as external since it is external to the aircraft spoiler system 1, but it will be appreciated that it is not external to the aircraft. The external power supply may also be referred to as the aircraft power supply. The power supply connectors 12, 16 are not visible in the perspective view of FIG. 3, but it will be appreciated with reference to FIGS. 5 and 6 that these power supply connectors 12, 16 are located out of view down and to the right with reference to the perspective of FIG. 3.

During normal operation the motor 4 has full control of the spoiler 2. The motor 4 drives the spoiler 2 to any desired position and also holds it in that desired position. However, under some circumstances there may be a fault with the supply of power to the motor 4. Under such circumstances the motor 4 loses control of the spoilers 2.

When the spoiler is in the retracted position it is acted on by the air load acting on the aircraft wing, in such a way that a force pushes the spoiler upwards (relative to its normal in-flight orientation). Thus, absent any balancing force, in the event that the motor 4 failed and could not hold the spoiler 2 in the retracted position, it would be pushed up by the air load to the deployed position. This is very dangerous since it would cause an unintentional reduction of lift for the aircraft. In order to prevent this, the movement limiting portion 14 is provided. This may also be referred to as an anti-extension device, since it prevents (under certain circumstances) the extension of the spoiler 2 to the deployed position.

Figure 2:
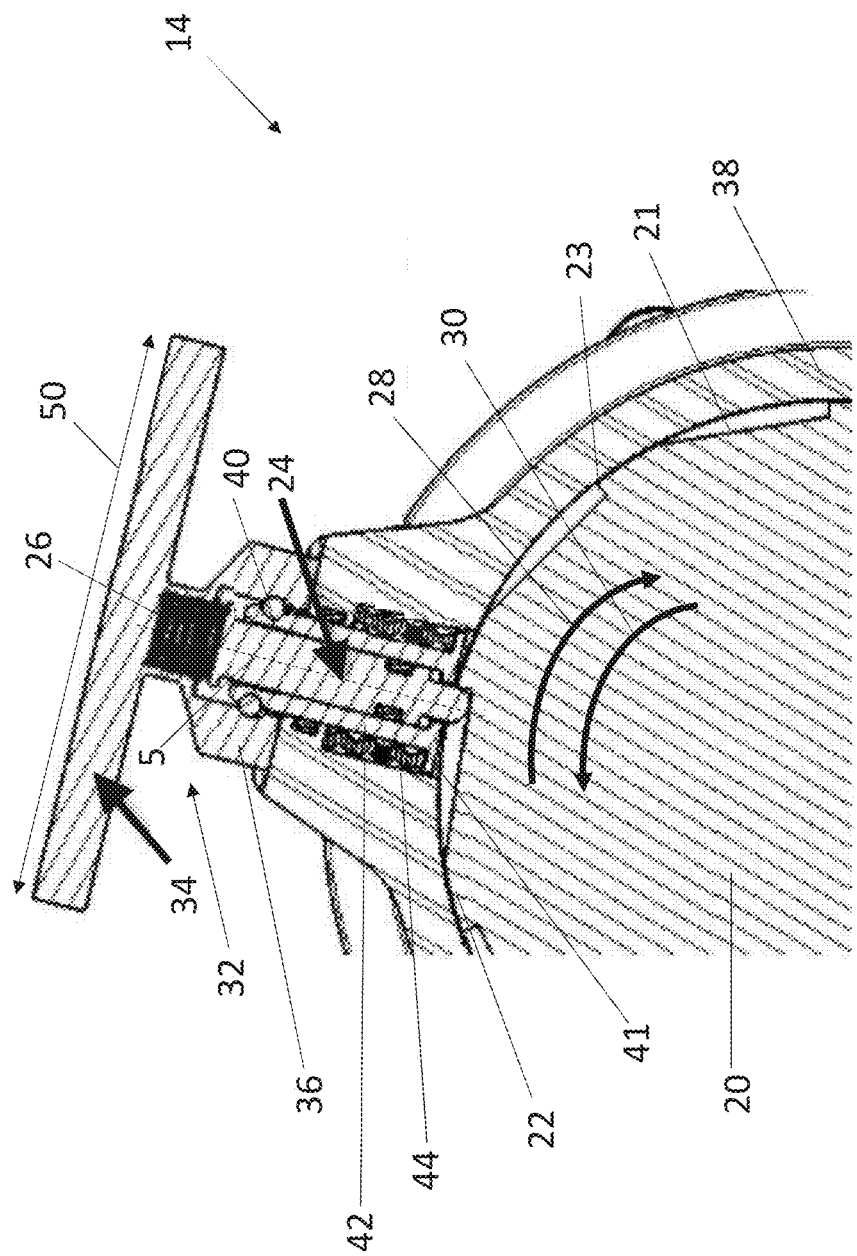
FIG. 2 is a cross-sectional view showing part of the movement limiting portion of the aircraft spoiler system of FIG. 1, with the mechanical actuator in the first position.
Figure 3:
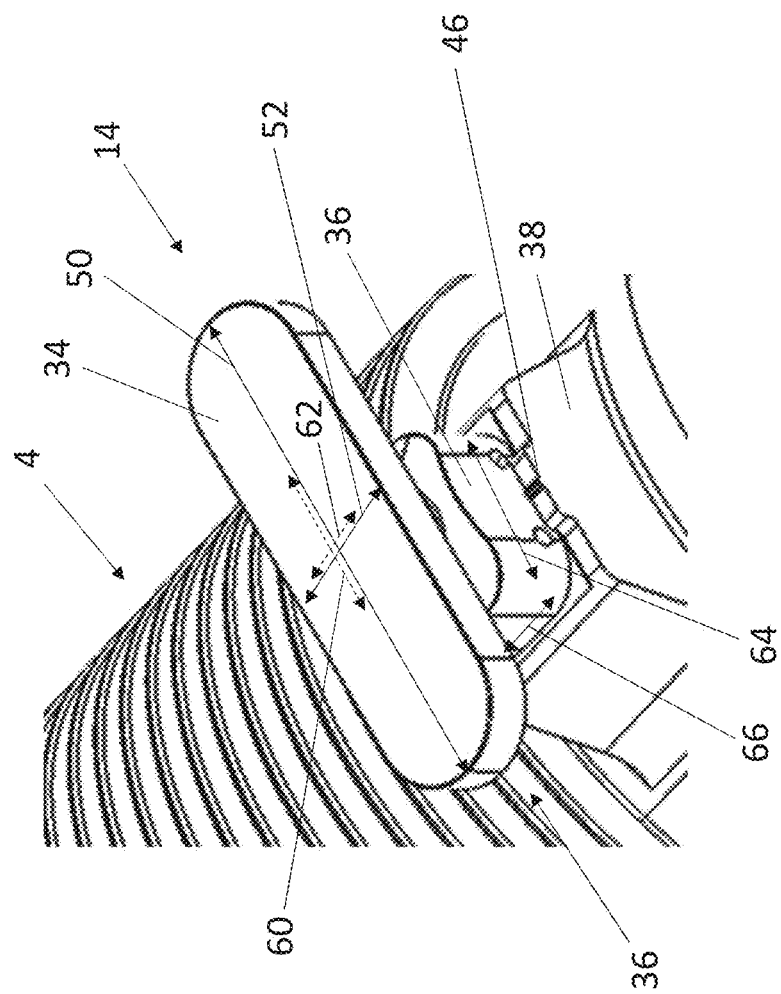
FIG. 3 is a perspective view showing part of the aircraft spoiler system of FIG. 1.

A cross-section of the movement limiting portion 14 is shown in FIG. 2. It includes a wheel 20 which has teeth 22 arranged along its outer edge (i.e. its outer circumference). It further includes a pin 24 and a pin biasing spring 26. The pin 24 extends along an axial direction of the wheel 20 (i.e. in the plane of the wheel 20), and it is biased towards the outer edge of the wheel 20 by the pin biasing spring 26.

The wheel 20 may be connectable (i.e. when the movement limiting portion is engaged) to the shaft 6 in any suitable manner such that as the shaft 6 is rotated to move the spoiler 2 to the retracted position the wheel 20 is rotated in the clockwise direction as indicated by the outer arrow 28 seen in FIG. 2 and as the shaft 6 is rotated to move the spoiler 2 to the deployed position the wheel 20 is rotated in the anti-clockwise direction as indicated by the inner arrow 30. This connection may be achieved directly, i.e. by having the shaft provide the wheel 20, or connecting the wheel 20 directly to the shaft 6, or it may be achieved by intermediate connecting elements, e.g. a clutch connection.

Each tooth 22 has a first sloped surface 21, which has a gentle slope, and a second, sloped surface 23 which has a sharp angle, or may even extend axially relative to the wheel 20. Thus, each tooth 22 is asymmetrical (relative to an axis extending along the axial direction).

It can be seen that, when engaged, the movement of the wheel 20 (and therefore of the spoiler 2 towards the retracted position) is enabled, since as the wheel 20 rotates clockwise the pin 24 can slide up the gently sloped tooth 21, and then drop into the groove formed by the next tooth, to enable clockwise rotation of the wheel 20. By contrast, anti-clockwise movement of the wheel 20 (and therefore movement of the spoiler 2 to the deployed position) is prevented since after a short distance of anti-clockwise rotation the protruding part of the pin 24 will contact against the sharply sloped surface 23 of the tooth 22, and jam against it, preventing further anticlockwise movement.

The movement limiting portion 14 is selectively engageable. As set out above, the movement limiting portion 14 is not engaged during normal operation of an aircraft, but is engaged if there is a fault with the motor power supply. This selective engagement depending on a fault condition may be achieved directly or indirectly through control of the pin 24 (i.e. preventing the jamming of the motion of the wheel 20), or it may be achieved by controlling the connection of the movement limiting portion 14 to the shaft 6, based on detecting a fault condition.

The fact that the movement limiting portion 14 is arranged to automatically engage in the event of failure of a power supply to the motor 4 is problematic for maintenance purposes. During maintenance of an aircraft, on the ground, no power is supplied to the aircraft spoiler system 1, and therefore by default the movement limiting portion 14 will be engaged, and will prevent movement of the spoiler 2 to the deployed position. This interferes with carrying out proper maintenance operations.

The movement limiting portion 14 is therefore provided with a mechanical actuator 32 which is able to disengage the movement limiting portion 14. In the particular example of the Figures, this disengagement is achieved by retracting the pin 24 axially away from the wheel 20, as described in further detail below.

The mechanical actuator 32 includes a handle 34 and a base portion 36. The base portion 36 contacts a housing 38 of the movement limiting portion 14. The pin 24, described above, is accommodated in co-axial central cavities within the handle 34, the base portion 36, and the housing 38. The pin biasing spring 26, described above, is located within the handle 34.

FIG. 2 shows the mechanical actuator 32 in the first position, in which engagement of the movement limiting portion 14 is enabled. As described above in practice it may still be disabled when the mechanical actuator 32 is in this position since it may be disabled through some other mechanism because no power fault is detected. Where engagement under fault conditions is controlled separately (not through pin 24) then FIG. 2 shows the state of the mechanical actuator 32 during a normal mode of operation of the aircraft spoiler system 1 and during a power fault mode of operation of the aircraft spoiler system 1. This position is also shown in the perspective view of FIG. 3.

Figure 4:
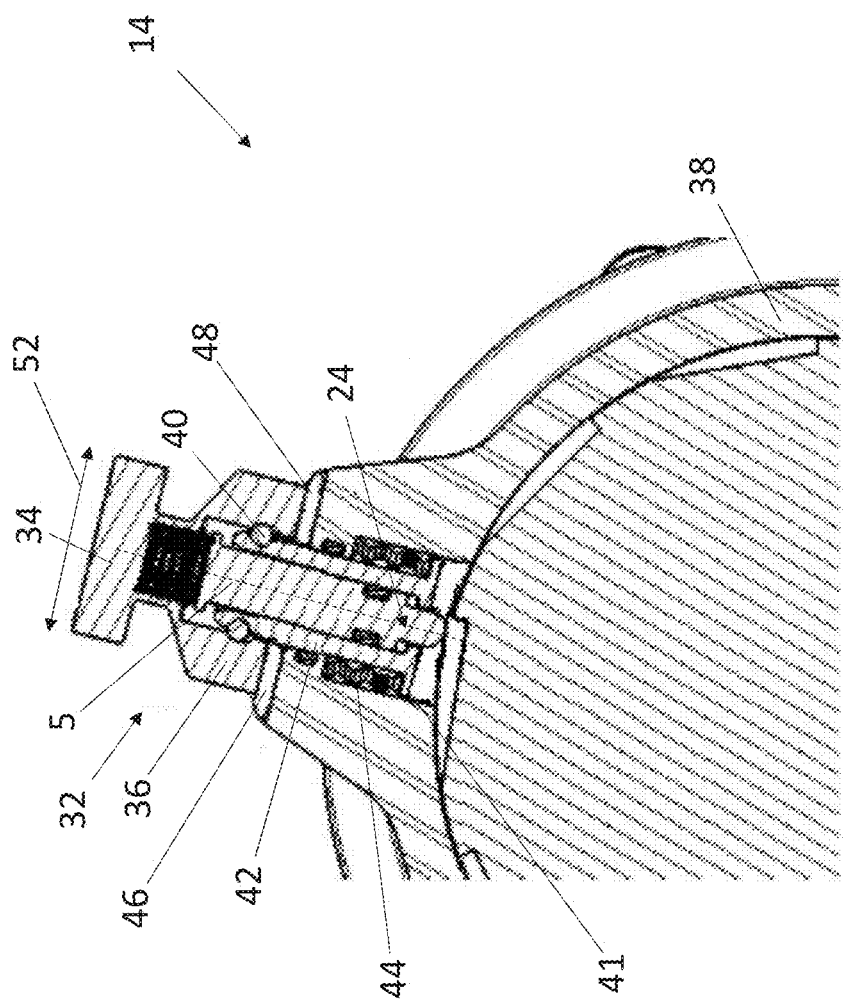
FIG. 4 is a cross-sectional view showing part of the movement limiting portion of the aircraft spoiler system of FIG. 1, with the mechanical actuator in the second position.

FIG. 4, discussed below, is a cross-sectional view showing the mechanical actuator 32 in the second position, in which the movement limiting portion 14 (and in particular, in this example, the pin 24) is disengaged.

The operation of the pin 24 has already been described. The handle 34, operating together with a connector 40, a spring engagement portion 42 and a mechanical actuator biasing spring 44, is able to selectively lift the pin 24 up (i.e. axially outwards of the wheel 20), sufficiently far that the inner end of the pin 24 is no longer able to engage the teeth 22 of the wheel 20.

The mechanical actuator biasing spring 44 is located within the central bore in the housing 38, in particular in a larger-diameter section of that bore. A lower (i.e. axially inner with respect to the wheel 20) end of the spring 44 abuts against a lip 41 extending outwards (perpendicular to the axial direction) from the spring engagement portion 42. The upper (axially outer) end of the spring engagement portion 42 is connected to the handle 34 by means of the connector 40 that is engaged between them. Thus, when the handle 34 is pulled upwards (axially outwards), the connector 40 is moved upwards, bringing the spring engagement portion 42 with it, and therefore lifting the pin 24 which is arranged within the spring engagement portion 42.

Lifting the spring engagement portion 42 (by lifting the handle 34) also compresses the spring 44. Thus, if the handle 34 is simply lifted and no other action is taken, the maintenance person would have to hold the handle 34 in this position to keep the movement limiting portion 14 disengaged, as the handle 34 would move back to the axially inwards position as soon as released.

Instead, the handle is arranged to be rotated to the second position, and, in the rotated second position, to engage with a first retaining portion 46 and a second retaining portion 48 arranged on the housing 38. In this example the retaining portions 46, 48 are formed integrally by the housing 38. The retaining portions 46, 48 retain the mechanical actuator 32 in the second position (shown in FIGS. 4 and 6), and thereby keep the pin 24 disengaged. The operation of these retaining portions 46, 48 is described in greater detail below.

In addition to disengaging the movement limiting portion 14 before carrying out maintenance operations, it is also critically important for safety purposes that the power supply to the aircraft spoiler system 1 (e.g. to the control unit 10) is disconnected before maintenance operations are carried out.

It is a key insight of the Applicant that a mechanical actuator which operates in the manner described above, moving between a first position and a second position to be disengaged for maintenance, can advantageously be designed and positioned so as to be functionally linked to the disconnection of the power supply—i.e. such that the mechanical actuator is movable to the second position only if the power supply to the aircraft spoiler system is disconnected and the power supply cannot be re-connected with the mechanical actuator in the second position. This advantageous feature is illustrated in FIGS. 5 and 6, which each show a view from above which includes the handle 34 of the movement limiting portion 14 and the power supply connector 12.

As described further below, the handle 34 is rotated around an axis of rotation, referred to as a rotation axis 5, which extends along an axial direction of the pin 24. In a plane perpendicular to the axis of rotation 5, the handle 34 has a first length 50 along a first direction, and a second length 52 along a second direction.

Figure 5:
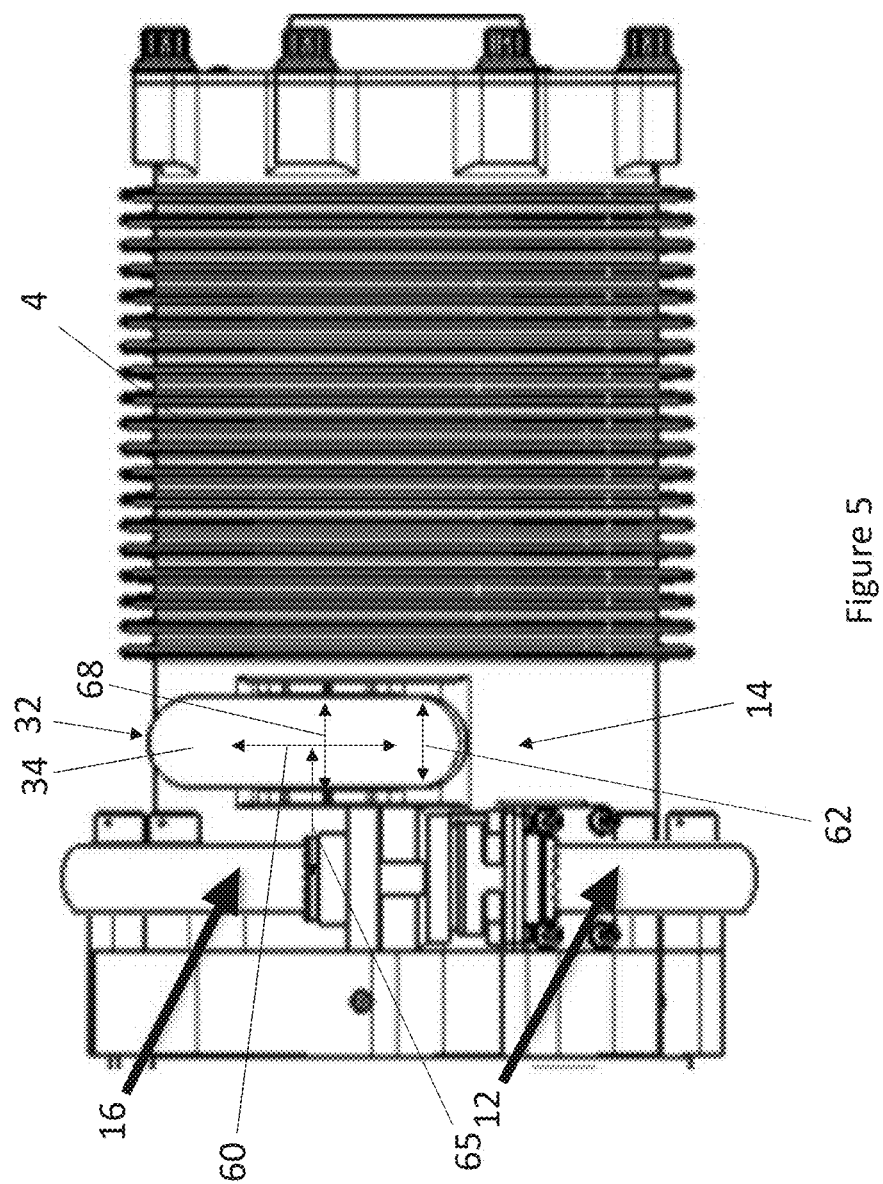
FIG. 5 is a perspective view from above showing part of the aircraft spoiler system of FIG. 1, with the mechanical actuator in the first position.

In FIG. 5, the handle 34 is in the first position (of FIGS. 2 and 3), and the power supply connector 12 is connected to an external power supply connector 16 of an external power supply. Thus, maintenance cannot safety be carried out, both because the power supply is connected and because the movement limiting portion 14 is engaged. In the first position, the first length 50 (which is longer than the second length 52) extends along a first direction 60.

Figure 6:
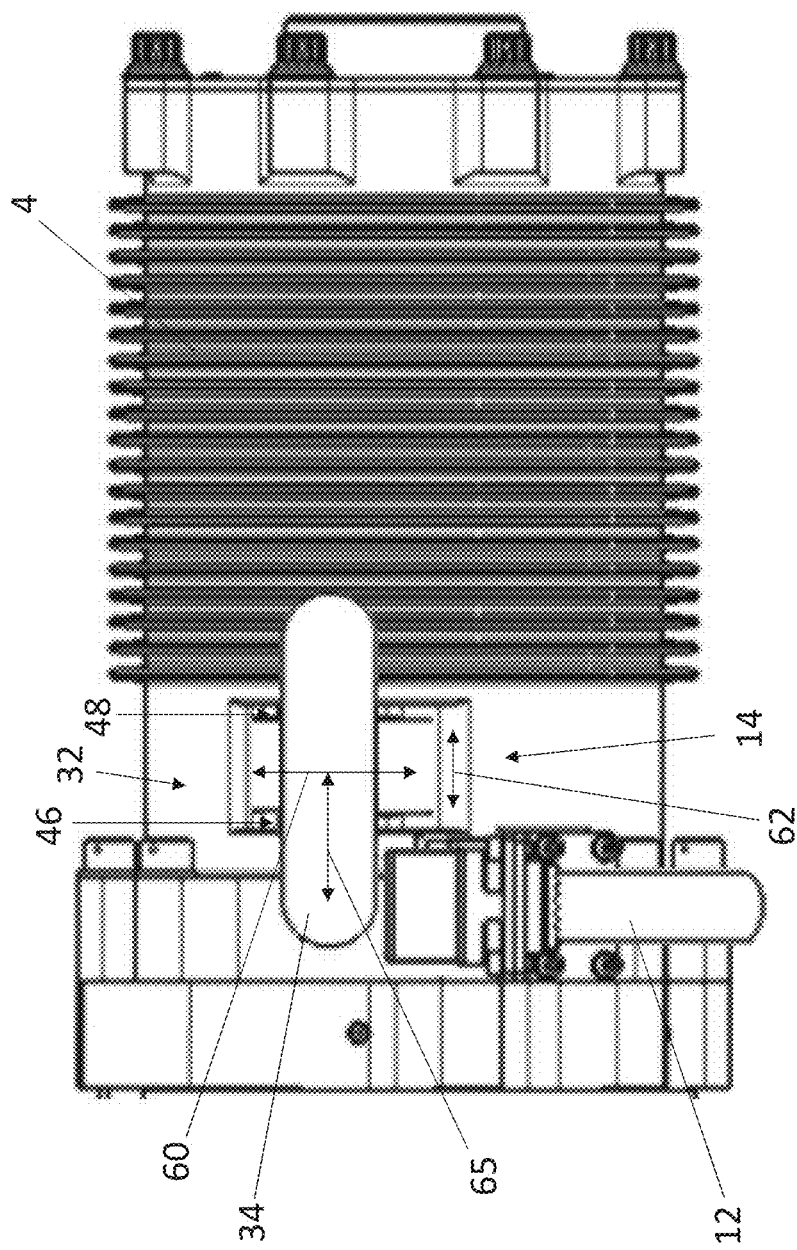
FIG. 6 is a perspective view from above showing part of the aircraft spoiler system of FIG. 1, with the mechanical actuator in the second position.

In FIG. 6, the handle 34 has been moved to the second position, so as to disengage the movement limiting portion 14, and allow maintenance of the spoiler 2. In particular, the handle 34 has been rotated 90° around the axis of rotation 5 (which may be clockwise or anticlockwise, according to the particular example), such that the longer first length 50 now extends along a second direction 62, perpendicular to the first direction 60. Thus, in this orientation the handle 34 extends further along the second direction 62 than when it is in the first position. In order to create a space for the handle 34 (i.e. the extra length than the handle has in this orientation) to move into, the external power supply connector 16 has been removed from the power supply connector 12. It can be seen that in the second position, due to its increased length along the second direction, the handle 34 obstructs the power supply connector 12 (i.e. it is located in front of the part that connects to another power connector), such that connection to an external power supply is not possible whilst the handle 34 remains in the second position. This advantageously helps to improve safety for a maintenance person since it is not possible to disable the movement limiting portion 14 but forget to disconnect the power supply, and it is also not possible to re-connect the power supply until the movement limiting portion 14 has been re-engaged.

This can further be appreciated by considering the spacing distance 65 by which the power supply connector 12 is spaced apart from the rotation axis 5 of the mechanical actuator 32. It will be appreciated that from the perspective of FIGS. 5 and 6 the rotation axis 5 extends into the page, at the centre point of the handle 34. It can be seen in FIGS. 5 and 6 that the power supply connector 12 (or more specifically the area in front of the power supply connector 12, in which a connector must be located to connect to the power supply connector) is spaced apart from the rotation axis 5 by a spacing distance 65. The spacing distance 65 is less than half the first distance 50. Half of the first distance 50 is the distance that the handle 34 extends towards the power supply connector 12 in the second position, and therefore this relationship of lengths ensures that in the second position the handle 34 obstructs an external power supply from connecting to the power supply connector 12.

It is further advantageous that retaining portions 46, 48 are provided to retain the movement limiting portion 14 in the second position, until it is deliberately actuated to be moved back to the first position (i.e. rotated back by hand).

The base portion 36 of the mechanical actuator 32 has a first length 64 along a first direction and a second length 66, along a second direction, perpendicular to the first direction. In the first position, seen in FIG. 3, the first length 64 extends along the first direction 60 and the second length 66 extends along the second direction 62. The base portion 36 rotates together with the handle 34. In this example the base portion 36 is elongate along the same direction as the handle 34. The first length 64 is greater than the second length 66.

In this example, each retaining portion 46, 48 is an elongate ridge, extending along the first direction (i.e. the ridge is elongate along the first direction). Each ridge 46, 48 protrudes above the rest of the housing 38.

The ridges 46, 48 are separated along the second direction 62 by a separation distance 68, as seen in FIG. 5. The separation distance 68 is smaller than the first length 64 of the base portion (i.e. its larger dimension), but is larger than the second length 66 of the base portion (i.e. its smaller dimension).

Thus, when the mechanical actuator 32 is in the first position (of FIGS. 2, 3 and 5), the base portion 36 fits between the two elongate ridges 46, 48, since its length along the second direction, the second length 66, is smaller than the separation distance 68 between the ridges 46, 48. It is biased towards the housing 38 by the action of the mechanical actuator biasing spring 44, and it therefore abuts against the top of the housing 38, sitting between the ridges 46, 48. This keeps the pin 24 axially close enough to the wheel 20 to engage with the teeth 22 of the wheel 20 as shown in FIG. 2 and as explained above.

When the mechanical actuator 32 is actuated to the second position (of FIGS. 4 and 6), by lifting and rotating the handle 34, this also rotates the base portion 36 so that the base portion 36 now extends a first length 64 along the second direction. This first length 64 is greater than the separation distance 68 and therefore the base portion 36 in this orientation does not fit between the ridges 46, 48, but rather rests on top of the ridges 46, 48. This holds the handle 34, and therefore the pin 24, axially outwards of the wheel 20, and therefore the pin 24 is disengaged as described above.

Figure 7:
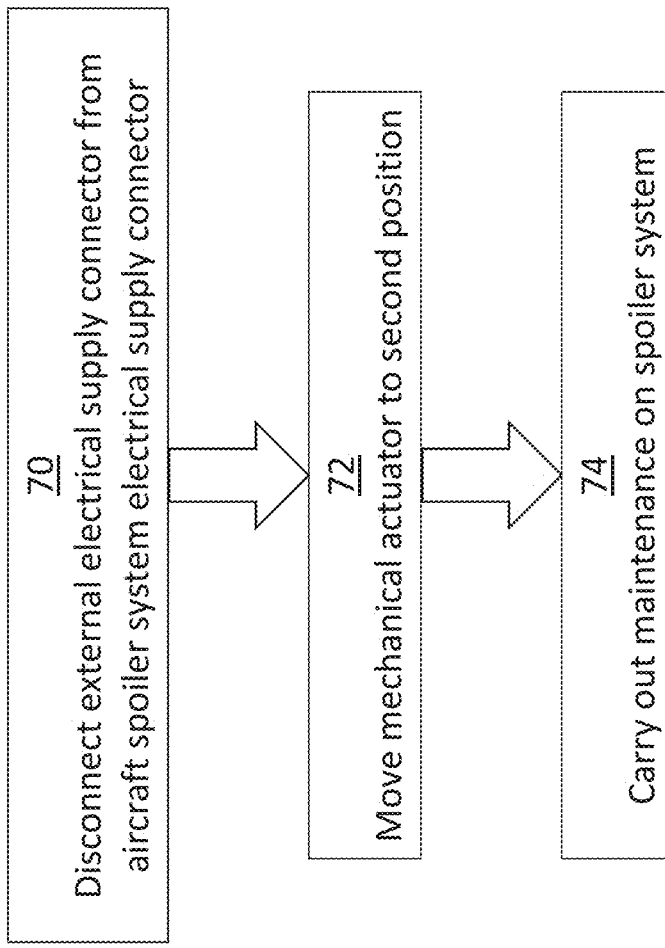
FIG. 7 is a flow diagram illustrating a method of putting an aircraft spoiler system into a maintenance mode of operation according to the present disclosure.

FIG. 7 is a flow diagram illustrating a method according to an example of the present disclosure. The illustrated method is a method of putting an aircraft spoiler system into a maintenance mode of operation.

In a first step 70 of this method, an operator (i.e. a maintenance person) disconnects the external power supply connector 16 from the aircraft spoiler system power supply connector 12. Then, after disconnecting the electrical supply, the maintenance person then actuates the mechanical actuator 32 (i.e. lifts and rotates the handle 34) from the first position to the second position, so as to disengage the movement limiting portion 14. After these two steps have been carried out it is safe for the maintenance person to carry out maintenance on the aircraft spoiler system, as illustrated at step 74 (i.e. it is in the maintenance mode). As described above, because of the specific layout of the described aircraft spoiler system components, it is not possible to carry out step 72 without first carrying out step 70, thus improving safety for the maintenance person by ensuring that step 70 is not missed before carrying out maintenance.

Figure 8:
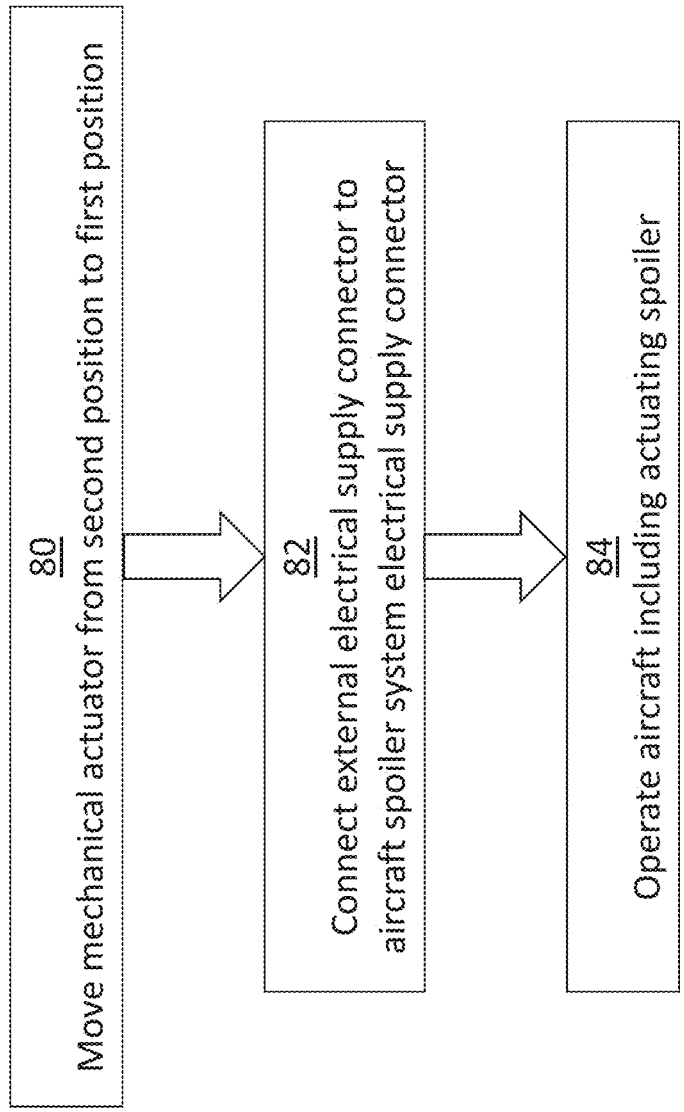
FIG. 8 is a flow diagram illustrating a method of taking an aircraft spoiler system out of the maintenance mode of operation and putting it in an operational mode of operation according to the present disclosure.

FIG. 8 is a flow diagram illustrating a method according to an example of the present disclosure. The illustrated method is a method of taking an aircraft spoiler system out of the maintenance mode of operation and putting it in an operational mode of operation.

In a first step 80 of this method, the maintenance person actuates the mechanical actuator 32 (i.e. rotates the handle 34) from the second position to the first position, so as to engage the movement limiting portion 14. As explained above, this may not actually cause movement of the spoiler to be limited, since the movement limiting portion 14, or its connection to the spoiler, may also separately be controlled by a fault detection system which causes it to engage only under suitable fault conditions. However, it ensures that it is not disengaged by the described mechanical actuator 32, and that therefore engagement of the movement limiting portion 14 is possible.

Having turned the handle 34 to the first position, the maintenance person at step 82 then connects the external power supply connector 16 to the aircraft spoiler system power supply connector 12.

After these two steps have been carried out the aircraft spoiler system is then fully operational (i.e. it is in the operational mode), and the aircraft can be operated for normal use (i.e. flight), including actuating the spoiler between the retracted and the deployed positions, as illustrated at step 84.

As described above, because of the specific layout of the described aircraft spoiler system components, it is not possible to carry out step 82 without first carrying out step 80, thus improving safety of the aircraft spoiler system by ensuring that the power cannot be re-connected without also re-engaging the movement limiting portion 14.

It will be appreciated by those skilled in the art that the disclosure has been illustrated by describing one or more specific aspects thereof, but is not limited to these aspects; many variations and modifications are possible, within the scope of the accompanying claims.

The invention claimed is:

1. An aircraft spoiler system, comprising;
   a spoiler;
   a motor arranged to drive movement of the spoiler between a retracted position and a deployed position;
   a power supply connector arranged for connection to an external power supply, to supply power to the aircraft spoiler system; and
   a movement limiting portion, wherein the movement limiting portion is selectively engageable and wherein the movement limiting portion is arranged, when engaged, to enable movement of the spoiler towards the retracted position and to prevent movement of the spoiler towards the deployed position;
   the movement limiting portion comprising a mechanical actuator, actuatable to move between a first position and a second position, wherein actuation of the mechanical actuator to the second position disengages the movement limiting portion;
   wherein, in the second position, the mechanical actuator obstructs the power supply connector such that the mechanical actuator cannot be actuated to the second position if the power supply connector is connected to the external power supply and such that the power supply connector cannot be connected to the external power supply if the mechanical actuator is in the second position.

2. The aircraft spoiler system of claim 1, wherein the mechanical actuator is actuatable between the first position and the second position by rotation of the mechanical actuator around a rotation axis.

3. The aircraft spoiler system of claim 2, wherein the mechanical actuator is rotationally asymmetric about the rotation axis.

4. The aircraft spoiler system of claim 3, wherein the mechanical actuator comprises an elongate portion, wherein the elongate portion extends a first length along a first direction in a plane perpendicular to the rotation axis, and extends a second length along a second direction in the plane perpendicular to the rotation axis, the first direction being perpendicular to the second direction, and the first length being longer than the second length.

5. The aircraft spoiler system of claim 1, further comprising a retaining portion arranged to retain the mechanical actuator in the second position.

6. The aircraft spoiler system of claim 5, wherein the retaining portion comprises an elongate ridge.

7. The aircraft spoiler system of claim 5, wherein the mechanical actuator is actuatable between the first position and the second position by rotation of the mechanical actuator around a rotation axis; and
   wherein the mechanical actuator comprises a base portion, the base portion extending a first length along a first direction in a plane perpendicular to the rotation axis, and extending a second length along a second direction in the plane perpendicular to the rotation axis, the first direction being perpendicular to the second direction, and the first length being longer than the second length; and
   wherein the aircraft spoiler system further comprising a first retaining part and a second retaining part, the first and second retaining parts separated by a separation distance along a separation direction in the plane perpendicular to the rotation axis, wherein the separation distance is larger than the second length and wherein the separation distance is shorter than the first length.

8. The aircraft spoiler system of claim 7, wherein the retaining portion comprises an elongate ridge, and wherein the length of the elongate ridge perpendicular to the separation distance is less than the first length of the base portion.

9. The aircraft spoiler system of claim 1, wherein the mechanical actuator is actuatable between the first position and the second position by rotation of the mechanical actuator around a rotation axis, and wherein the mechanical actuator is biased downwards along the rotation axis.

10. The aircraft spoiler system of claim 1, wherein the movement limiting portion comprises:
    a wheel having a toothed outer circumference; and
    a pin movable between an engaged position in which it is in contact with the toothed outer circumference, and a disengaged position in which it is withdrawn away from the toothed outer circumference, wherein the mechanical actuator is connected to the pin.

11. The aircraft spoiler system of claim 10, wherein the mechanical actuator is actuatable between the first position and the second position by rotation of the mechanical actuator around a rotation axis, wherein the pin extends along the rotation axis of the mechanical actuator.

12. The aircraft spoiler system of claim 10, wherein the movement limiting portion further comprises a pin biasing spring, arranged to bias the pin towards the toothed outer circumference of the wheel, and wherein the pin biasing spring is located within the mechanical actuator.

13. The aircraft spoiler system of claim 1, wherein the movement limiting portion comprises a housing and a mechanical actuator biasing spring, wherein the mechanical actuator biasing spring is positioned between the housing and the mechanical actuator to bias the mechanical actuator towards the housing.

14. A method of putting an aircraft spoiler system into a maintenance mode of operation, comprising:
    disconnecting an external power supply connector from a power supply connector of the aircraft spoiler system; and
    actuating a mechanical actuator of a movement limiting portion from a first position to a second position, wherein the movement limiting portion is arranged, when engaged, to enable movement of the spoiler towards the retracted position and to prevent movement of the spoiler towards the deployed position and wherein actuation of the mechanical actuator to the second position disengages the movement limiting portion, and wherein, in the second position, the mechanical actuator obstructs the power supply connector such that the mechanical actuator cannot be actuated to the second position if the power supply connector is connected to the external power supply.

15. A method of taking an aircraft spoiler system out of a maintenance mode of operation and putting it in an operational mode of operation, comprising:
    actuating a mechanical actuator of a movement limiting portion from a second position to a first position, wherein the movement limiting portion is arranged, when engaged, to enable movement of the spoiler towards the retracted position and to prevent movement of the spoiler towards the deployed position and wherein actuation of the mechanical actuator to the second position disengages the movement limiting portion, and wherein, in the second position, the power supply connector cannot be connected to the external power supply if the mechanical actuator is in the second position; and
    connecting an external power supply connector to a power supply connector of the aircraft spoiler system.

* * * * *